2,781,183

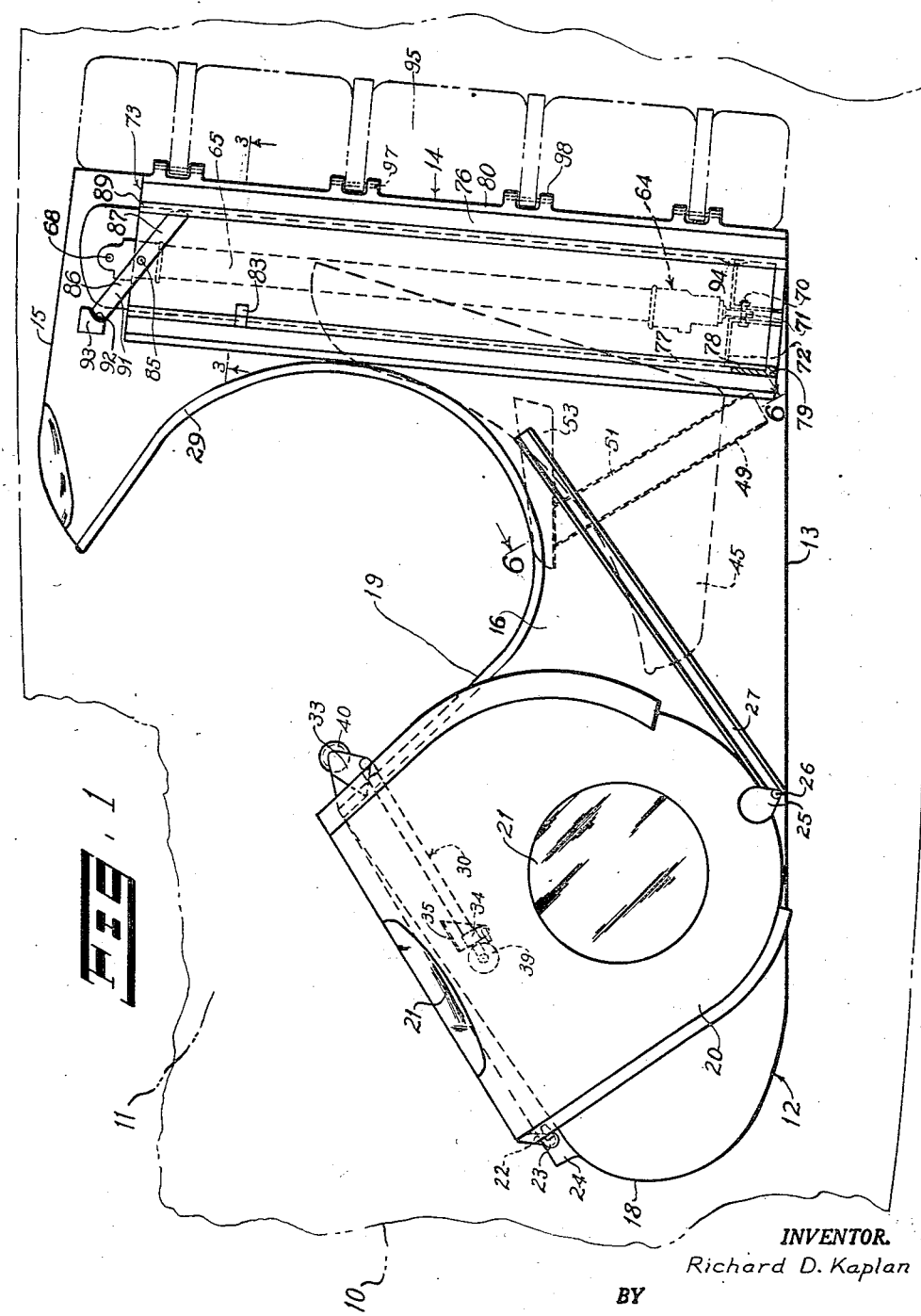

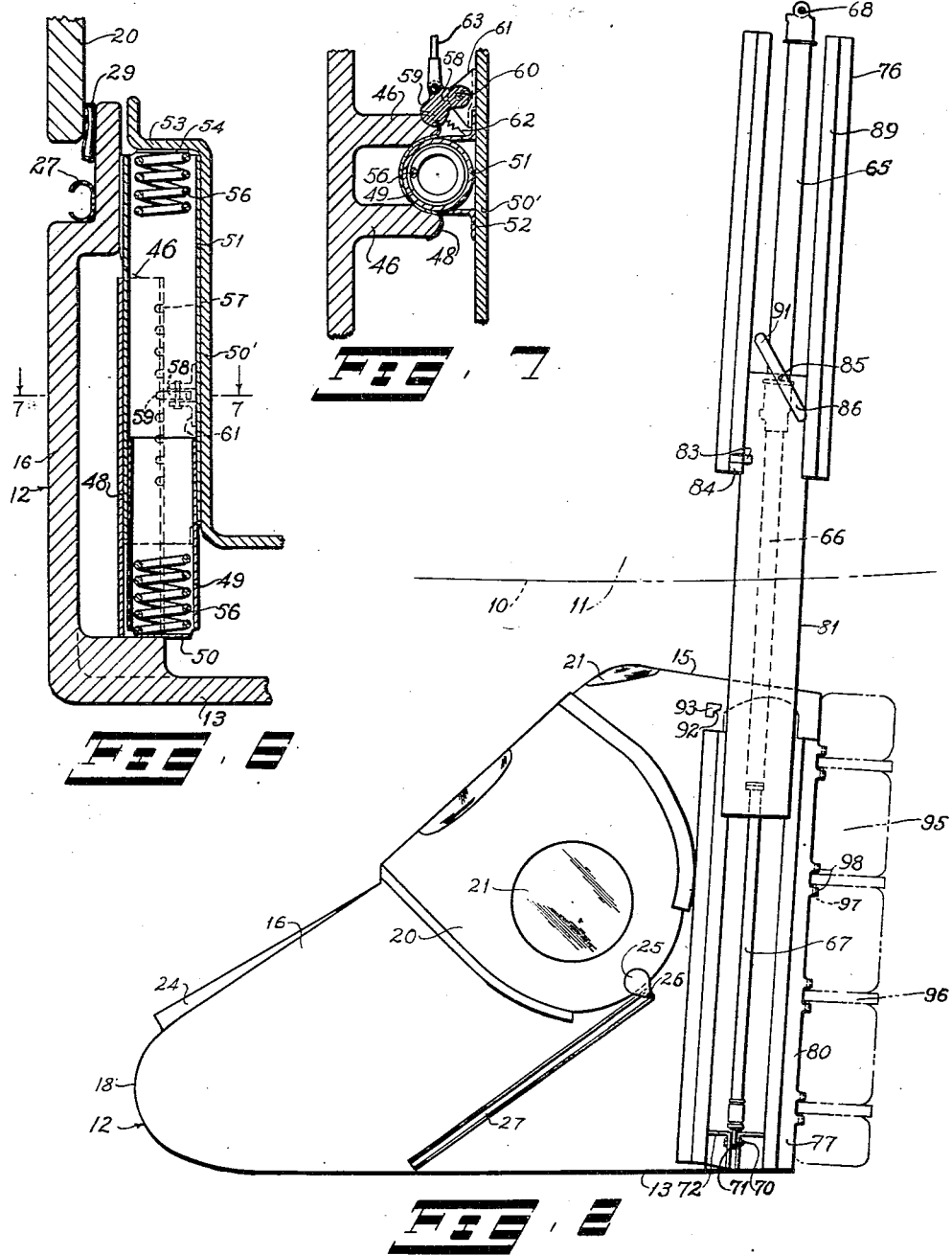

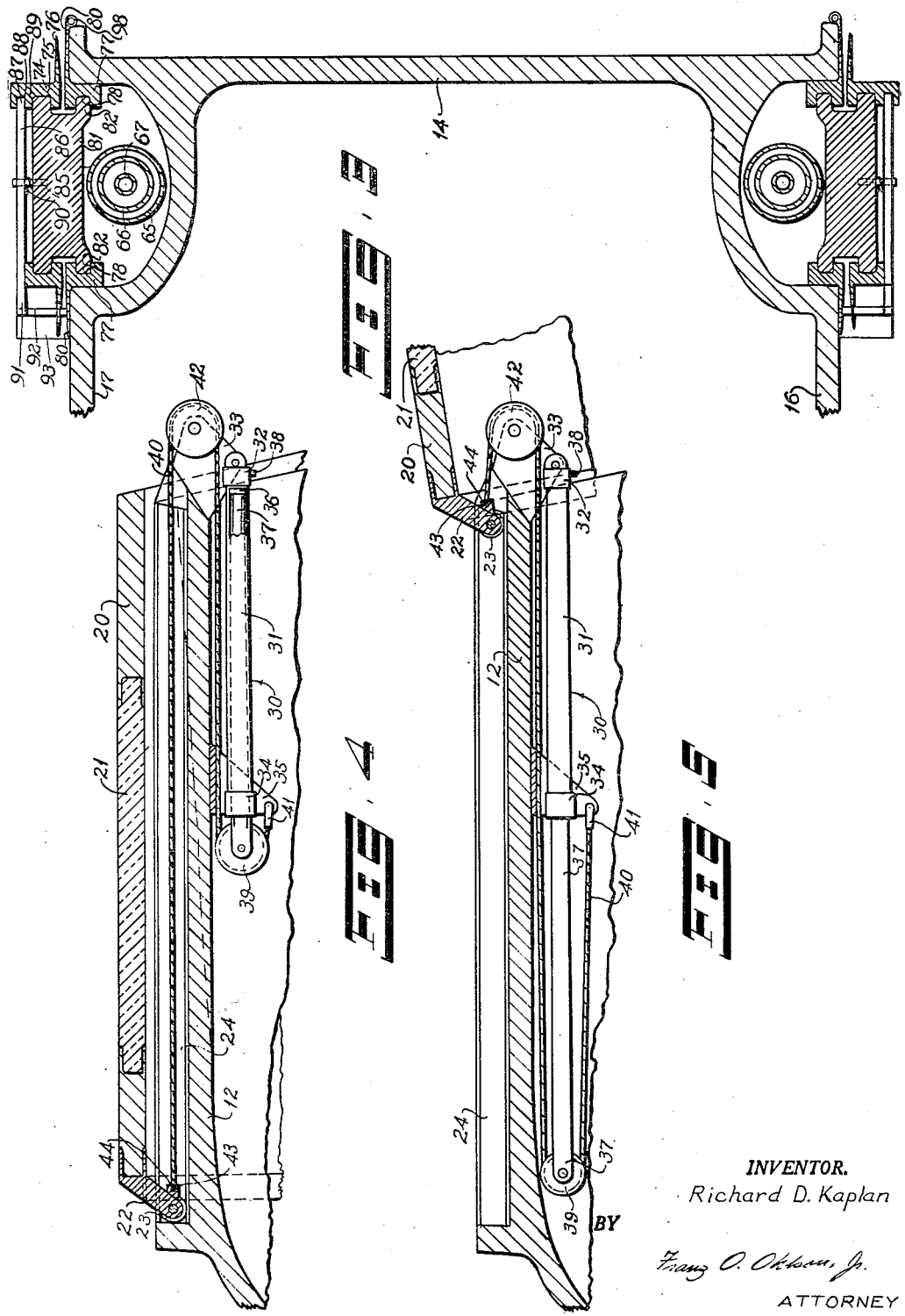

JETTISONABLE PILOT COMPARTMENT

Richard D. Kaplan, East Meadow, N. Y., assignor to Republic Aviation Corporation, near Farmingdale, N. Y., a corporation of Delaware Application September 8, 1954, Serial No. 454,809

12 Claims. (Cl. 244—140)

This invention relates in general to aircrafts and more particularly has to do with a pilot or passenger compartment for releasable association with the fuselage of an aircraft.

Among other objects the present invention contemplates a compartment having an adjustable seat therein to accommodate a pilot or passenger, and means for mounting the compartment within the fuselage of an aircraft so that it may be ejected therefrom during flight or may be raised into or lowered out of the associated fuselage when the aircraft is on the ground.

With the above and other objects in view, as will be apparent, this invention consists in the construction, combination and arrangement of parts all as hereinafter described, claimed and illustrated in the accompanying drawings, wherein:

Fig. 1 is a side elevation of the pilot's compartment contemplated herein showing the same positioned within the fuselage of an aircraft;

Fig. 2 is a side elevation showing the pilot's compartment in its lowered position beneath the fuselage;

Fig. 3 is a section taken along line 3—3 of Fig. 1;

Fig. 4 is a longitudinal section through the door-closing mechanism of the compartment contemplated herein showing the parts thereof when the door is in its open position.

Fig. 5 is a longitudinal section the same as Fig. 4 but showing the parts of the door-closing mechanism in their position when the door is closed;

Fig. 6 is a section taken along line 6—6 of Fig. 1 showing means for adjusting the pilot's seat; and Fig. 7 is a section taken along line 7—7 of Fig. 6.

One of the problems posed in the operation of high speed aircraft is to provide means whereby a pilot or other occupant of the aircraft may safely abandon the aircraft during flight. In aircraft operating below sonic speed, this problem has been solved, to a certain extent, by providing ejection seats or devices that forcibly eject or throw the pilot or passenger out and clear of the aircraft thereby permitting a descent by parachute. It has been found, however, that in aircraft travelling at sonic or supersonic speeds the sudden ejection of the unprotected pilot or passenger into the airstream causes serious, if not fatal, injuries. This is believed to be caused, in whole or in part, by the impact of the airstream, which is moving at sonic or supersonic velocity relative to the aircraft, against the unprotected pilot or passenger.

Therefore, the present invention proposes a compartment, or pod, having a seat therein for a pilot or other occupant and wherein the means for entering and leaving the pod is sealed in its closed position to the end the pilot or occupant may be enclosed completely within and protected by the pod. Means operatively connected between the pod and the fuselage of an aircraft serve to position and hold the pod within a space provided for it in the fuselage and to eject the pod and guide it during its ejection therefrom. Conventional parachute means associated with the pod provide for its safe descent after its ejection from the aircraft.

Thus, by enclosing the pilot or occupant within a sealed pod he is protected from the impact of the airstream upon ejection. Moreover, by guiding the pod during its ejection any accidental collision between the pod and the aircraft is prevented. In addition, since the pod is sealed, it may be pressurized and oxygen from a suitable source carried within the pod can be supplied to the pilot or occupant to permit a safe descent from a high-altitude ejection and the pod is capable of floating should the descent terminate in water.

In addition to the foregoing, the present invention also provides means for raising or lowering a pilot or other occupant into and out of the fuselage of an aircraft when the aircraft is on the ground. Thus, in instances where due to the design of the aircraft its fuselage is positioned a substantial distance above the ground, the means for positioning the pod within the fuselage and for ejecting it are so constructed and arranged that the pod can be lowered from or raised into the fuselage to thereby serve as an elevator for the pilot or other occupant. It is manifest that in this instance, the present invention eliminates the need for stairs or step-ladders such as are ordinarily provided to permit ingress and egress from aircraft of this type.

Referring now to the drawings and more particularly Fig. 1, 10 designates a portion of the fuselage of an aircraft having a chamber 11 defined therein to receive a compartment or pod 12.

The pod 12 is designed to accommodate a pilot or occupant in a seated position and to that end comprises a structure having a bottom wall or floor 13, a rear or back wall 14, a roof or top wall 15, left and right vertical side walls 16 and 17, respectively, and a sloping, curved, forward wall 18 the sides of which merge with and form continuations of the side walls 16 and 17, while its lower and upper portions respectively merge with and form continuations of the floor 13 and roof 15. An opening or doorway 19 formed through the forward wall 18 adjacent the upper portion thereof and extending partially down the side walls 16 and 17, provides means whereby the pilot or other occupant may enter or leave the pod 12.

To provide means for closing the opening or doorway 19, a door 20 having windows 21 mounted therein is constructed and arranged for sliding movement over the forward wall 18 of the pod 12 between a first position where it is disposed forward or below the doorway 19, as shown in Fig. 1, and a second position where it is disposed over and closes the doorway 19, as shown in Fig. 2. To the above ends the door 20 is provided at its central forward edge portion with a bracket 22 in which is rotatably supported a roller 23. The roller 23 is adapted to operatively engage a track 24 that is mounted on or formed integrally with the outer surface of the forward wall 18 and disposed substantially along the longitudinal center line thereof. In addition, a bracket 25 (Figs. 1–2) mounted to the lower left side of the door 20 rotatably supports a roller 26 that operatively engages a track 27 that is suitably secured to the side 16 of the body 12 in substantial parallel relationship with the track 24. The right hand side of the door 20 is also provided with a bracket and roller (not shown) that operatively engages a track similar to the track 27 but which is mounted on the right side 17 of the pod 12.

In order to completely seal the joint between the door 20 and the doorway 19, a resilient tubular seal 29, shown in Fig. 6, is suitably secured to the outer side of the structure of the pod 12 defining the doorway 19 and is positioned to engage the edge portion of the door 20 when it is in its closed position. If desired, the seal 29 may be connected to a suitable source of pressure (not shown) whereby it may be inflated to thereby assure a tight, leakproof engagement between the seal 29 and the associated edge portion of the door 20.

To move the door 20 to its closed or second position prior to the ejection of the pod 12 and thereby completely enclose the pilot or occupant within the pod 12, a door closing assembly generally indicated as 30 is operatively connected between the pod 12 and the door 20. As shown in Figs. 4 and 5, the door-closing means or assembly 30 comprises a cylinder 31 that is suitably secured at one of its ends 32 to a bracket 33 carried by the structure of the pod 12 adjacent the forward or lower central portion of the doorway 19, while its opposite end 34 is secured by conventional means (not shown) to a bracket 35 that is fixedly secured to the inner surface of the forward wall 18. Slidably mounted within the cylinder 31 is a piston 36 carrying a piston rod or stem 37 that is extensible from the end 34 of the cylinder 31. The cylinder 31 is provided at its end 32 with a port 38 that is connected to a source of pressure (not shown) carried by the pod 12. Suitable valve means (not shown) control the introduction of pressure through the port 38 into the cylinder 31 or connects the port 38 to atmosphere to bleed or vent the cylinder 31. These valve means may be pilot operated or, if desired, connected to the means for ejecting the pod 12 so that it is automatically operated just prior to the ejection of the pod. The end of the piston stem 37 extending outwardly from the cylinder 31 has rotatably mounted thereon a pulley 39. A cable 40 fixedly secured at one of its ends 41 to the bracket 34 passes over the pulley 39 to a second pulley 42 that is rotatably supported in the bracket 33. The cable 40 then passes over the pulley 42 and through the track 24 to an ear or extension 43 formed on the bracket 22 where its opposite end 44 is fixedly secured thereto. Because of the foregoing, when pressure is introduced through the port 38 into the cylinder 31, the pressure is effective on the piston 36 to extend the piston stem 37 from the cylinder 31. As a result, the pulley 39 moves forwardly or away from the end 34 of the cylinder 31 thereby placing the cable 40 under tension so as to slide the door 20 within the tracks 24 and 27 to its closed position where it completely covers the doorway 19. When the valve means are actuated to bleed or vent the cylinder 31 the weight of the door 20 causes it to slide downwardly or forwardly on the tracks 24 and 27 to its open position and at the same time, the cable 40 pushes the piston stem 37 back into the cylinder 31.

The pod 12 is provided with a conventional seat 45 to accommodate a pilot or other occupant in a seated position and to the end that occupants of different sizes or statures may be accommodated, the means for mounting the seat 45 within the pod 12 are adjustable. The means for adjustably mounting the seat 45 are disposed on either side thereof and the adjacent inner side of the pod 12 and since the elements thereof are the same on either side only one side the left, has been shown. It is understood that the mounting means for the left side of the seat 45 hereinafter described, are duplicated on the opposite or right side of the seat 45 and the adjacent side of the pod 12.

As shown more particularly in Figs. 1, 6 and 7, the mounting means for the seat 45 comprise a pair of parallel spaced ribs 46 formed on the inner surface of the side wall 16 and which extend inwardly into the interior of the pod 12 and are inclined or slanted upwardly and forwardly from a point adjacent the floor 13 and rear wall 14 to a point substantially below the center of the doorway 19. A semi-circular guide 48 is suitably secured to the ribs 46 with its concave portion facing into the interior of the pod 12. A cylindrical tube 49 fixedly secured at its lower or closed end 50 to the floor, extends forwardly and upwardly in close parallel relationship with and partially along the length of the guide 48.

A cylindrical tube 51 is secured to the side 50' of the seat 45 by brackets 52 so as to be disposed parallel to and in sliding engagement with the guide 48. The tube 51 extends from the under side of the arm rest 53 of the seat 45, to which its upper closed end 54 is suitably secured, and partially along the guide 48. At its lower, open end the tube 51 telescopingly engages the upper portion of the tube 49. A spring 56 is operatively positioned within the telescoped tubes 49 and 51 between their respective closed ends 50 and 54. Because of the foregoing, the spring 56 imposes a force on the seat 45 that tends to move it upwardly and forwardly in the pod 12, such movement being guided by the sliding engagement of the telescoped tubes 49 and 51 and the tube 51 with the guide 48.

To hold the seat 45 in a selected position, one of the ribs 46 is provided along the medial part of its length with a series of spaced notches 57. A catch 58 adapted at one of its ends 59 to engage the notches 57 is pivotally mounted at its opposite end 60 to a bracket 61 suitably secured to the adjacent side of the seat 45. A spring 62 operatively connected between the catch 58 adjacent its end 59 and the bracket 61 tends to move the catch 58 in a direction to engage the end 59 thereof with one of the notches 57. To remove or disengage the end 59 of the catch 58 from the notch 57 with which it is then associated, a cable 63 is suitably secured to the side of the catch 58 in opposition to the spring 62. Thus, placing the cable 63 under tension disengages the end 59 of the catch 58 from its associated notch 57.

Because of the foregoing arrangement, the seat 45 may be adjusted to a desired position by placing the cable 63 under tension thereby disengaging the catch 58 from the notch 57 with which it is then engaged and freeing the seat 45 for movement by the spring 56. By applying a suitable force to the seat 45 in opposition to the force exerted by the spring 56, the seat 45 may be adjusted either upwardly and forwardly or downwardly and rearwardly to a desired position after which the tension on the cable 63 is relieved thus permitting the spring 62 to engage the end 59 of the catch 58 with the adjacent notch 57 to thereby lock the seat 45 in its adjusted position.

As shown in Figs. 1, 2 and 3, the fuselage 10 is provided with a chamber 11 to receive and house the pod 12. Suitable door means, not shown, but which may be similar in construction and operation to the bomb-bay doors of a bomber-type aircraft, are provided in the lower or bottom portion of the fuselage 10 to permit movement of the pod 12 into and out of the chamber 11.

To provide means whereby the pod 12 is raised or lowered into or out of the chamber 11, or ejected therefrom, an actuator assembly 64 is operatively connected between the fuselage 10 and the pod 12. The actuator assembly 64 may be of any conventional construction that is capable of operating at a first speed for raising or lowering the pod 12 into and out of the fuselage 10 under normal conditions and at a second speed whereby the pod 12 is lowered forcibly and quickly under emergency conditions. Since actuator assemblies capable of the foregoing operation are readily procurable on the market and in many forms, the particulars of the construction and operation of the actuator assembly 64 are not set forth herein.

For present purposes, the actuator assembly 64 is of the pneumatic type and comprises an upper cylinder 65, an intermediate cylinder 66 that is adapted to be retracted into or extended from the upper cylinder 65 and a lower cylinder 67 is adapted to be retracted into or extended from the intermediate cylinder 66. The actuator assembly 64 is connected to a suitable pneumatic system including control means operable from the pod 12, not shown, whereby a pneumatic pressure is delivered selectively to the upper cylinder 65 to sequentially retract or extend the intermediate and lower cylinders 66 and 67 respectively.

At its upper end, the actuator assembly 64 is fixedly secured to the structure of the fuselage 10 by a pin 68 which is engaged with the adjacent structure, not shown, within the chamber 11 of the fuselage 10. The lower end of the actuator assembly 64 is releasably secured to the pod 12 by a conventional shear pin 70 that passes through a bracket 71 carried by the lower cylinder 67 and which is engaged at its opposite ends in a pair of angle irons or structural members 72 that form a part of the lower structure of the pod 12. The shear pin 70 is so constructed and arranged that under normal operation of the actuator assembly 64 to raise or lower the pod 12 into or out of the fuselage 10, the pin 70 effectively supports the weight of the pod 12 and any other forces imposed thereon during such movement. However, under emergency conditions when the actuator assembly 64 is operated at its second speed, the forces produced by the weight of the pod 12 and its rapid and forceful movement by the actuator assembly 64 cause the pin 70 to shear or break thereby releasing or disconnecting the pod 12 from the actuator assembly 64.

The pod 12 is guided or supported against horizontal lateral or longitudinal displacement during its vertical movements into and out of the fuselage 10, either under normal or emergency operation of the actuator assembly 64, by means of a pair of composite ways or tracks 73 that are disposed on opposite sides of the pod 12 and of the chamber 11 in the fuselage 10 and operatively connected therebetween. Since the composite tracks 73 are identical in construction and operation only one, the left, will be described in detail.

As shown more particularly in Figs. 1, 2 and 3, the composite track 73 comprises a set or pair of fuselage rails 74 each having a groove 75 formed therein that extends throughout the length of the rail. The fuselage rails 74 are disposed in spaced relationship parallel to each other and substantially vertical with respect to the fuselage 10, with the groove 75 of one fuselage rail 74 facing the groove 75 of the other. Each fuselage rail 74 is provided with a laterally extending flange 76 that is secured by suitable fastening means to the adjacent structure, not shown, of the fuselage 10 defining the chamber 11.

Each composite track 73 also includes a set or pair of pod rails 77 each of which is provided with a groove 78 that extends substantially throughout its length but which terminates short of the lower end of the rail to form a stop 79. As in the instance of the fuselage rails 74, each pod rail 77 has formed thereon a lateral flange 80 that is secured by suitable fastening means, not shown, to the adjacent side wall of the pod 12. The pod rails 77 are positioned on the pod 12 adjacent the rear wall 14 thereof and with their grooves 78 facing each other in spaced parallel relationship. Moreover, the pod rails 77 are so positioned on the pod 12 that when it is in its retracted position as shown in Fig. 1, the pod rails 77 are disposed parallel to and substantially coextensive with the fuselage rails 74 but spaced therefrom.

In addition to the fuselage rails 74 and the pod rails 77, each composite track 73 also includes an intermediate rail 81 having spaced, laterally disposed tongues 82 extending throughout its length for slidable engagement with the grooves 75 of the fuselage rail 74 and with the grooves 78 of the pod rails 77. Thus the intermediate rail 81 serves to operatively interconnect the fuselage rails 74 with the pod rails 77 in such a manner that the composite track 73 may be contracted to a relatively short length as shown in Fig. 1 or extended to a considerable length as shown in Fig. 2. In order to prevent the disengagement of the rail 81 from the fuselage rails 74 when the former reaches its lowest desired travel on the latter, an outstanding lug or ear 83 is mounted on, or formed integrally with, the upper end portion of the intermediate rail 81 and positioned to engage an outstanding boss 84 secured to or formed integrally with the lower end of one of the fuselage rails 74. Thus when the rail 81 slides downwardly on the fuselage rails 74 through a preselected travel as determined by length of the fuselage rails 74 and the positions of the lug 83 and the boss 84, the former engages the latter to thereby prevent further downward sliding movement of the intermediate rail 81 on the fuselage rails 74. As shown in Fig. 1, the boss 84 is carried by the forwardly disposed fuselage rail 74 and the lug 83 is positioned on the intermediate rail 81 so as to engage the boss 84. It is understood, however, that other means of arresting the travel of the intermediate rail 81 on the fuselage rails 74 may be utilized, the boss 84 and the lug 83 being shown merely as one means of accomplishing this end.

It is desirable to provide means whereby the fuselage rails 74, the intermediate rail 81 and the pod rails 77 slide sequentially with respect to one another. For example, when the pod 12 is being lowered from the fuselage 10, either under normal or emergency conditions, it is desirable to interconnect the intermediate and pod rails 81 and 77, respectively, so that they slide downwardly as a unit on the fuselage rails 74, until the rail 81 reaches its lowest point of travel where the lug 83 engages the boss 84, and then to disconnect them so that the pod rails 77 slide downwardly on the intermediate rail 81. With this construction and operation the proper support of the pod 12 during vertical movement thereof and the proper displacement of the pod 12 below the fuselage 10 is assured so that when the pod 12 is released from the actuator assembly 64 upon the breaking of the shear pin 70, it will fall free of the aircraft to thereby prevent any accidental collision between the pod 12 and the aircraft.

To the above end, a pin 85 is fixedly secured at one of its ends into the intermediate rail 81 adjacent its upper portion and a latch 86 is pivotally mounted on the pin 85. One end 87 of the latch 86 is adapted to be slidably engaged within a groove 88 that is formed in track 89 formed integrally with one of the fuselage rails 74. As shown in Fig. 3, the track 89 is formed integrally with the afterwardly disposed fuselage rail 74 and is substantially coextensive therewith. A spring 90 encircling the pivot pin 85 is operatively connected at one of its ends to the pivot pin 85 and at its other end to the latch 86 in such a manner that it applies a force to the latch 86 tending to rotate it in a counterclockwise direction about its pivot pin 85, thereby maintaining the end 87 of the latch 86 in engagement with the groove 88 in the track 89. The opposite end 91 of the latch 86 is adapted to engage a curved latching surface 92 formed on an outwardly extending stud 93 fixedly mounted to the side wall of the pod 12 adjacent its upper portion. The end 91 of the lever 86 and the curved latching surface 92 of the stud 93 are so constructed that the rotation of the latch 86 in a clockwise direction readily disengages its end 91 from the latching surface 92 of the stud 93. Adjacent the lower end of the groove 88, a cam surface 94 extends partially into the groove 88 so as to be engaged by the end 87 of the latch 86 just prior to the time that the lug 83 on the intermediate rail 81 engages the boss 84 on the forward fuselage rail 74 to arrest the sliding movement of the intermediate rail 81 on the fuselage rails 74. The end 87 of the latch 86 and the cam surface 91 are so constructed and arranged that as the former contacts and then slides over the latter, the latch 86 is rotated in a clockwise direction against the force of the spring 90 and any weight of the pod 12 that may be imposed on the end 91 of the latch 86 through the stud 93. As a result, the end 91 of the latch 86 is disengaged from the stud 93 and the intermediate rail 81 disconnected from the pod 12. Thereafter, the pod rails 77 are free to slide downwardly on the intermediate rail 81.

When the pod 12 is in its retracted position as shown in Fig. 1, the end 91 of the lever 86 is engaged with the curved latching surface 92 of the stud 93 that is carried by the pod 12 and the opposite end 87 of the lever 86 is engaged with the groove 88 in the track 89. It is evident, therefore, that the intermediate rail 81 is interconnected with the pod 12, and hence with the pod rails 77, so that the pod rails 77 and the intermediate rail 81 slide together as a unit on the fuselage rails 74 when the pod 12 is lowered from the fuselage 10 by the actuator assembly 64. However, when the interconnected rails 81 and 77 approach the lower end of the fuselage rail 74, the end 87 of the latch 86 comes into engagement with the cam surface 94 disposed in the groove 88 of the track 89. The cam surface 94 coacts with the end 87 of the latch 86 as above set forth to rotate it in clockwise direction thereby disengaging its opposite end 91 from the curved latching surface 92 of the stud 93. As a result the intermediate rail 81 is disconnected from the pod 12 and thereafter the pod rails 77 are free to slide downwardly on the intermediate rail 81 thereby permitting pod 12 to move downwardly.

As hereinabove set forth, the shear pin 70 that connects the lower end of the actuator assembly 64 to the pod 12 is effective to support the pod 12 under normal operation of the actuator asembly 64 in raising or lowering the pod 12 into and out of the fuselage 10. Therefore, under such normal operation of the actuator assembly 64, the downward movement of the pod rails 77 on the intermediate rail 81 is stopped upon the full extension of the actuator assembly 64. However, the upper ends of the grooves 78 in the pod rails 77 are unobstructed and, therefore, upon the emergency operation of the actuator assembly 64, the pod rails 77 slide off the lower end of the intermediate track 81 shortly after the shearing of the pin 70 disconnects the pod 12 from the actuator assembly 64. It is to be noted, that at this time the intermediate rail 81 has travelled substantially the full length of the fuselage rails 74 and the pod rails 77 the full length of the intermediate rail 81. It is evident, therefore, that before the pod 12 is fully released from the fuselage 10 the composite tracks 73 serve to guide the pod 12 and to prevent its lateral displacement until it has been lowered a substantial distance below the fuselage 10. It is manifest therefore, that due to the displacement of the pod 12 below the fuselage 10 any accidental collision therebetween is prevented upon the ejection of the pod 12 from the fuselage 10.

As shown in Fig. 1, the fuselage rails 74, the intermediate rail 81, and the pod rails 77 are substantially the same length and the actuator assembly 64 is so constructed that when its lower and intermediate cylinder 67 and 66 are retracted into the upper cylinder 65 the aforesaid rails are substantially coextensive. Moreover, when the actuator assembly 64 is fully extended, Fig. 2, the lower and upper portions of the fuselage rails 74 and the intermediate rail 81 and the upper and lower portions of the intermediate rail 81 and the pod rails 77 overlap one another. Due to this, the composite track 73 serves to firmly guide or support the pod 12 against displacement during its movements into and out of the fuselage 10. It is understood, however, that the relative lengths of the rails 74, 77 and 81 and the actuator assembly 64 as shown in the drawings, are illustrative only, and these dimensions may be varied as required depending upon the desired displacement of the pod 12 in its lowered position and the desired position of the pod 12 below the fuselage 10 upon its ejection.

When the pod 12 is raised by the actuator assembly 64 into the fuselage 10 from its lowered position, as shown in Fig. 2, the pod rails 77 slide upwardly upon the intermediate rail 81. As the pod 12 moves upwardly, the stud 93 of the pod 12 strikes the end 91 of the latch 86 and rotates the latch 86 in a clockwise direction against the force of the spring 90 thus permitting the stud 93 to move upwardly past the end 91 of the latch 86. However, as soon as the cam curved latching surface 92 comes into alignment with the end 91 of the latch 86, the spring 90 rotates the lever 86 in a counterclockwise direction, thereby engaging the end 91 of the latch 86 with the curved latching surface 92 of the stud 93. At substantially the same time, the stops 79 of the pod rails 77 contact and engage the lower ends of the tongues 82 of the intermediate rail 81 that are engaged with the grooves 78 of the pod rails 77 to the end that the intermediate rail 81 and the pod rails 77 move upwardly as a unit on the fuselage rails 74.

In order to provide for the safe descent of the pod 12 after its ejection from the fuselage 10, a conventional parachute assembly 95 is secured to the pod 12 by suitable means such as a plurality of straps 96. Each strap 96, in turn, is secured by its opposite ends to a pin 97 that is engaged in a pair of spaced ears 98 formed on and along the rear edge of the aftwardly disposed pod rail 77. Since neither the parachute assembly 95, nor the means for releasing the same form a part of the instant invention they have not been shown or described in any detail.

Having thus described the details of construction and operation of the present invention, it is evident that when the aircraft with which the pod 12 is associated is on the ground, the pod 12 will be in its lowered position as shown in Fig. 2 with its door 20 open as shown in Fig. 1. The pilot or other occupant may then step from the ground into the pod 12 through the open doorway 19 and be seated in the seat 45. Should there be need to adjust the seat 45, the pilot places the cable 63 under tension thereby removing the end 59 of the catch 58 from its associated notch 57. The seat 45 is then free to be moved by the springs 56. The pilot can then brace himself against the pod 12 and by pressing downwardly compress the springs 56 thereby moving the seat 45 downwardly and aftwardly or by raising himself permit the springs 56 to move the seat 45 upwardly and forwardly. When the seat 45 reaches its desired adjusted position, the tension on the cable 63 is relieved and the spring 62 will then rotate the catch 58 to engage its end 59 with the adjacent notch 57 thereby locking the seat 45 in its adjusted position.

The pilot then operates the controls for the actuator assembly 64, not shown, which are situated in the pod 12, in such a manner that it is operated to raise the pod 12 into the chamber 11 provided therefor in the fuselage 10. The composite tracks 73 then function as hereinbefore set forth to guide the pod 12 into the chamber 11. Moreover, when the pod 12 has reached its desired position within the chamber 11 and the actuator assembly 64 stopped, the composite tracks 73 serve to securely hold the pod 12 in this position during the take-off, flight and landing of the aircraft.

Upon the landing of the aircraft after its flight the pilot operates the controls for the actuator assembly 64 so as to lower the pod 12 from its chamber 11. During such movement the composite tracks 73 function as hereinbefore set forth to guide the pod 12 as it is lowered. When the pod 12 reaches its lowest position upon the full extension of the actuator assembly 64, the pilot can then step out of the pod and onto the ground.

In the event emergency conditions arise during flight which would necessitate the abandonment of the aircraft, the pilot operates the controls for the door-closing assembly 30 to pressure through the cylinder port 38 into the cylinder 31. The pressure is effective on the piston 36 to move it within the cylinder 31 so as to extend the piston rod 37 thereby moving the pulley 39 away from the end 34 of the cylinder 31 and placing the cable 40 under tension. As a result the door 20 is slid upwardly along the tracks 24 and 27 to its closed position where it is disposed over and closes the doorway 19. As hereinbefore set forth, the seal 29 disposed between the edge portions of the doorway 19 and the door 20 is then effective to seal the pod 12. At this time, the pilot or passenger within the pod 12 is completely enclosed and protected by the pod 12.

The pilot then operates the controls for the actuator assembly 64 in such a manner as to operate it at its second speed whereby the pod 12 is rapidly and forcefully lowered so as to eject it from the fuselage 10. During such downward movement of the pod 12 the composite tracks 73 operate as above set forth to guide the pod 12. In this respect it is to be noted, that the pod rails 77 and the intermediate rail 81 slide downwardly as a unit on the fuselage rails 74 until the latter reaches its full travel where further downward movement of the intermediate rail 81 is prevented by the engagement of the lug 83 with the boss 84. Moreover, just prior to the stopping of the intermediate rail 81, the latch 86 is disengaged from the stud 93 thereby permitting the pod rails 77 to slide on the intermediate rail 81. It is evident therefore that before the pod 12 falls or is pushed free of the intermediate rail 81 it has been supported or guided by the tracks 73 to a point substantially below the fuselage 10 thereby preventing any accidental collision of the pod 12 with the aircraft after its ejection. Further, since the door 20 has been moved to its closed position prior to the ejection of pod 12 thereby enclosing completely the pilot therewithin, he is protected from the impact of the airstream when the pod 12 is ejected.

After the pod 12 has been ejected, the parachute assembly 95 becomes effective to safely lower the pod 12. In the event the parachute descent should terminate in water the sealed pod 12 will float until such time as assistance comes to the pilot.

What is claimed is:

1. The combination with a passenger compartment and an aircraft fuselage having a chamber therein to receive and house the compartment, of an actuator means operatively connected between the chamber and compartment for moving the compartment into and out of the chamber, and a plurality of composite tracks operatively connected between the chamber and the compartment to guide the movements of the latter into and out of the former, each of said composite tracks comprising a pair of spaced rails carried by the chamber, a pair of spaced rails carried by the compartment, an intermediate rail slidably engaged with said chamber and compartment rails, and means for interconnecting said intermediate and compartment rails whereby they move as a unit on said chamber rails.

2. The combination with a passenger compartment and an aircraft fuselage having a chamber therein to receive and house the compartment, of an actuator means operatively connected between the chamber and compartment for moving the compartment into and out of the chamber, and a plurality of composite tracks operatively connected between the chamber and the compartment to guide the movement of the latter into and out of the chamber, each of said composite tracks comprising spaced rails carried by the chamber, spaced rails carried by the compartment, an intermediate rail slidably engaged with and interposed between said chamber and compartment rails, and means for sequentially sliding said chamber, intermediate and compartment rails relative to each other.

3. The combination with a passenger compartment and an aircraft fuselage having a chamber therein to receive and house the compartment, of an actuator means operatively connected between the chamber and compartment for moving the compartment into and out of the chamber, and a plurality of composite tracks operatively connected between the chamber and the compartment to guide the movement of the latter into and out of the chamber, each of said composite tracks comprising spaced rails carried by the chamber, spaced rails carried by the compartment, an intermediate rail slidably engaged with said chamber and compartment rails, releasable means interconnecting said intermediate and compartment rails whereby they move as a unit on said chamber rails, and means for operating said releasable interconnecting means to disconnect said intermediate and compartment rails.

4. The combination with a passenger compartment and an aircraft fuselage having a chamber therein to receive and house the compartment, of an actuator means operatively connected between the chamber and compartment for moving the compartment into and out of the chamber, and a plurality of composite tracks operatively connected between the chamber and the compartment to guide the movements of the latter into and out of the chamber, each of said composite tracks comprising spaced rails carried by the chamber, spaced rails carried by the compartment, an intermediate rail slidably engaged with and interposed between said chamber and compartment rails, means for interconnecting said intermediate and compartment rails whereby they move as a unit on said chamber rails, and means for arresting the sliding movement of said intermediate rail on said chamber rails after said intermediate and compartment rails have moved as a unit along said chamber rails for a predetermined distance.

5. The combination with a compartment to receive an occupant and an aircraft fuselage having a chamber therein to receive and house the compartment, of an actuator means operatively connected between the chamber and compartment for moving the compartment into and out of the chamber, and a plurality of composite tracks operatively connected between the chamber and the compartment to guide the movement of the latter into and out of the former, each of said composite tracks comprising a pair of spaced rails carried by the chamber, a pair of spaced rails carried by the compartment, an intermediate rail slidably engaged with said chamber and compartment rails, releasable means for interconnecting said intermediate and compartment rails whereby they move as a unit on said chamber rails, means operable to arrest the movement of said intermediate rail on said chamber rails after said intermediate and compartment rails have moved as a unit on said chamber rails for a preselected distance, and means for operating said releasable interconnecting means to disconnect said intermediate and compartment rails prior to the operation of said arresting means.

6. The combination with the fuselage of an aircraft, of a chamber defined in the fuselage, a compartment constructed and arranged to accommodate an occupant and to be received and entirely housed within said chamber, an opening in said compartment, a door slidably mounted on the exterior of said compartment for movement relative to said opening to open or close the same, means for moving said door to its closed position, and extensible actuator means connected between said chamber and compartment for raising or lowering said compartment into and out of said chamber or forcibly ejecting said compartment out of said chamber, means for releasing said actuator means from said compartment only upon its full ejection, and means for guiding said compartment to a position removed from the fuselage upon its ejection and prior to its release from said actuator means.

7. The combination with the fuselage of an aircraft, of a chamber defined in the fuselage, a compartment constructed and arranged to accommodate an occupant and to be received and housed within said chamber, an opening in said compartment, a door slidably mounted on the exterior of said compartment for movement relative to said opening to open or close said opening, means for moving said door to its closed position, and extensible actuator means connected between said chamber and compartment for raising or lowering said compartment into and out of said chamber or ejecting said compartment out of said chamber, means effective to release said compartment from said actuator means only upon its full ejection, and extensible track means connected between said chamber and compartment for guiding said compartment during its movement by said actuator means, said track means being provided to guide said compartment to a position below the fuselage upon its movement from said chamber.

8. The combination with the fuselage of an aircraft, of a chamber defined in the fuselage, a pilot compartment constructed and arranged to accommodate the pilot of the aircraft and to be received and housed entirely within said chamber, an opening in said compartment, a door slidably mounted on the exterior of said compartment for movement relative to said opening to open or close said opening, means for moving said door to its closed position, extensible actuator means connected between said chamber and compartment and operative at a first speed to raise or lower said compartment into and out of said chamber and at a second speed to eject said compartment out of said chamber, means for releasing said compartment from said actuator means only upon its full ejection, and extensible track means connected between said chamber and compartment for guiding said compartment during its movement by said actuator means, said extensible track means comprising spaced rails carried by said chamber, spaced rails carried by said compartment, and an intermediate rail slidably engaged with both said chamber and compartment rails.

9. The combination with a passenger compartment and an aircraft fuselage having a chamber therein to receive and house the compartment, of an actuator means operatively connected between the chamber and compartment for moving the compartment into and out of the chamber, and a plurality of composite tracks operatively connected between the chamber and compartment to guide the movements of the latter into and out of the chamber, each of said composite tracks comprising spaced rails carried by the chamber, spaced rails carried by the compartment, an intermediate rail slidably engaged with and interposed between said chamber and compartment rails, means for interconnecting said intermediate and compartment rails whereby they move as a unit on said chamber rails, and means for disconnecting said intermediate and compartment rails and for arresting the sliding movement of said intermediate rail on said chamber rails after said intermediate and compartment rails have moved as a unit on said chamber rails for a predetermined distance.

10. The combination with an aircraft fuselage having a chamber therein, of a compartment constructed and arranged to enclose an occupant and to be received within the chamber, actuator means constructed and arranged for normal operation to raise or lower said compartment into and out of the chamber and for emergency operation to eject said compartment from the chamber, and means for releasing said compartment from said actuator means only upon the complete ejection of said compartment from the chamber.

11. In combination with a fuselage of an aircraft, a pilot compartment constructed and arranged to accommodate and completely enclose the pilot, a chamber in said fuselage to completely receive and house entirely said compartment, actuating means connected to said fuselage and compartment capable of dual operation either to move said compartment inwardly or outwardly of the chamber or to forcibly eject said compartment from said chamber, guiding means interposed between said fuselage and compartment for guiding said compartment during its movements relative to said fuselage, and means for releasing said compartment from said actuating and guiding means at the end of its forcible ejection.

12. In combination with a fuselage of an aircraft, a pilot compartment constructed and arranged to accommodate and completely enclose the pilot, a chamber in said fuselage to receive and house entirely said compartment, extensible actuating means connected to said fuselage and compartment to selectively move said compartment into or out of said chamber or to forcibly eject it therefrom, extensible guiding means interposed between said fuselage and compartment to guide the movements of the latter into and out of said chamber and its ejection therefrom, and means for releasing said compartment from said actuator and guiding means at the end of its forcible ejection from said chamber.

References Cited in the file of this patent

UNITED STATES PATENTS

| | | |
|---|---|---|
| 1,279,635 | Bevel | Sept. 24, 1918 |
| 2,339,120 | Ulinski | Jan. 11, 1944 |
| 2,459,843 | Scholander | Jan. 25, 1949 |
| 2,468,009 | Bigley | Apr. 19, 1949 |
| 2,640,612 | Barry | June 2, 1953 |

FOREIGN PATENTS

| | | |
|---|---|---|
| 281,322 | Switzerland | June 16, 1952 |
| 559,763 | Great Britain | Mar. 3, 1944 |
| 711,045 | Germany | Sept. 25, 1941 |
| 829,331 | France | Mar. 28, 1938 |